US012805484B2

(12) United States Patent
Zolotarev

(10) Patent No.: US 12,805,484 B2
(45) Date of Patent: Nov. 24, 2026

(54) CONTAINER FOR A DRY FEED FOR A DOMESTIC ANIMAL AND A SYSTEM FOR MANAGING AVAILABILITY OF THE FEED IN THE CONTAINER

(71) Applicant: Alexey Zolotarev, Valencia (ES)

(72) Inventor: Alexey Zolotarev, Valencia (ES)

( * ) Notice: Subject to any disclaimer, the term of this patent is extended or adjusted under 35 U.S.C. 154(b) by 287 days.

(21) Appl. No.: 18/784,388

(22) Filed: Jul. 25, 2024

(65) Prior Publication Data

US 2026/0026470 A1 Jan. 29, 2026

(51) Int. Cl.

| | |
|---|---|
| ***G01G 13/14*** | (2006.01) |
| ***A01K 5/02*** | (2006.01) |
| ***B65D 25/20*** | (2006.01) |
| ***B65D 51/24*** | (2006.01) |
| ***G01G 3/14*** | (2006.01) |
| ***G01G 19/52*** | (2006.01) |
| ***G01G 21/28*** | (2006.01) |
| ***G01G 23/42*** | (2006.01) |

(Continued)

(52) U.S. Cl.

CPC ............ *A01K 5/0291* (2013.01); *B65D 25/20* (2013.01); *B65D 51/242* (2013.01); *G01G 3/14* (2013.01); *G01G 13/14* (2013.01); *G01G 19/52* (2013.01); *G01G 21/28* (2013.01); *G01G 23/42* (2013.01); *G06Q 50/02* (2013.01); *G08C 17/02* (2013.01)

(58) Field of Classification Search

CPC .... A01K 5/0291; A01K 5/0283; B65D 25/20; B65D 51/242; G01G 3/14; G01G 19/52; G01G 21/23; G01G 21/28; G01G 23/42; G06Q 50/02; G08C 17/02

See application file for complete search history.

(56) References Cited

U.S. PATENT DOCUMENTS 4,044,920 A * 8/1977 Swartzendruber ..... G01G 13/16 73/862.622
5,386,944 A * 2/1995 Knepler ................ G01G 19/52 241/34

(Continued)

*Primary Examiner* — Randy W Gibson

(74) *Attorney, Agent, or Firm* — SALIWANCHIK, LLOYD & EISENSCHENK

(57) ABSTRACT

The invention relates to a field of smart storage and management of food consumption by domestic animals, and it concerns a container for a dry feed and a system for managing availability of the feed in the container. The container comprises a weighing device that is connected to a microcontroller that comprises a wireless communication module and that is configured to periodically record a weight, to transmit data via at least one communication channel and to initiate communication, when the recorded weight equals to or less than a measured weight threshold, and a cap of the container is sealable owing to an air pump having a control chip, a pressure sensor that is synchronized with the pump, and a pressure relief valve. The management system combines the container and a server of a container manufacturer owing to tools for processing data about dynamics of changing of the feed weight depending on a container weight and a recording period, tools for transmitting a notification to at least one user via a mobile application and/or an API protocol, and tools for initiating communication with the at least one user. The solution ensures storage of the feed, management of the feed stock and planning of interaction with feed suppliers.

24 Claims, 2 Drawing Sheets

(51) Int. Cl.
*G06Q 50/02* (2024.01)
*G08C 17/02* (2006.01)

(56) References Cited

U.S. PATENT DOCUMENTS

| | | | | | |
|---|---|---|---|---|---|
| 5,764,522 | A | * | 6/1998 | Shalev | A01K 5/02<br>177/116 |
| 8,944,249 | B1 | * | 2/2015 | Mullaney | G01G 19/52<br>177/144 |
| 9,347,821 | B1 | * | 5/2016 | Mullaney | B30B 9/3007 |
| 9,915,559 | B2 | * | 3/2018 | Radcliff | G01G 23/3735 |
| 10,139,211 | B1 | * | 11/2018 | Tillinghast | G01G 19/64 |
| 10,618,702 | B1 | | 4/2020 | Alexander | |
| 10,670,451 | B2 | * | 6/2020 | Dixon, Jr. | B65D 79/00 |
| 10,743,517 | B2 | | 8/2020 | Springer et al. | |
| 12,616,286 | B1 | * | 5/2026 | Cuevas | A45C 5/03 |
| 2016/0304268 | A1 | | 10/2016 | Schneider | |
| 2022/0240486 | A1 | | 8/2022 | Anderson et al. | |

* cited by examiner

CONTAINER FOR A DRY FEED FOR A DOMESTIC ANIMAL AND A SYSTEM FOR MANAGING AVAILABILITY OF THE FEED IN THE CONTAINER

FIELD OF THE INVENTION

The claimed group of inventions relates to a field of smart storage and management of food consumption by domestic animals such as cats and dogs, and it concerns a closed reusable feed storage container having an integrated function of analysis of the feed that remains therein based on automatic collection of a data about weight, and a system for managing orders of the feed to re-fill the container stock.

BACKGROUND

Management of the feed stock depending on the needs of the animal plays a significant role in feeding domestic animals. A widespread method for managing the stock is to manually measure the feed consumed by domestic animals and to intuitively plan a feed purchase based on a comparison of the feed remainder and the animal's appetite.

In order to ensure more accurate planning and to avoid human factor errors, the prior art teaches feed storage containers having elements for indicating its availability and mechanical tools for measuring a number of portions extracted. So, an indirect indication of the availability or absence of the feed along with the convenience of its taking may be provided by tools for lifting the feed as far as its weight in the container is reduced as taught, e.g., by the U.S. Pat. No. 10,618,702B1 dated Apr. 14, 2020. According to this solution, a lower portion of an inner volume of the container structure has springs embedded therein, the springs support a plate that is configured to arrange a dry feed, thereby forming a so-called double bottom of the container. When the feed is reduced and a load acting onto the plate is reduced, the springs are gradually released, thereby lifting the plate higher and visually indicating an amount of the feed that remained in the container, thereby allowing the user to define when the container must be re-filled. Also, it is known that it is possible to combine spring elements in the container structure in order to lift the feed with additional visual indication elements, e.g., a transparent wall of the container, as taught by the application US2016304268A1 dated Oct. 20, 2016.

A drawback of these solutions is that a human factor affects planning of an optimal amount of the feed in the container, when under certain circumstances the user may not pay sufficient attention to the content of the container which leads to late re-filling and insufficient amount of the feed and, thus, non-regular feeding, that may harm the domestic animal's health.

It is widely known that it is possible to combine the feed containers with feeding devices in a feeding system, where a portioning supply is performed by gravitational or mechanical dosing. In this case, the structure of the container implies the presence of a cap with a loading port and ports for pouring the feed or equipping an inner volume of the container with supplying elements such as augers or blades. At the same time, the container and/or the feeding device may be equipped with portion-controlling tools, preferably, electronic, programmable, etc., in order to compare the extracted portions with initial content and generate, according to this, notifications about re-filling necessity.

The problem of managing the feed stock in said systems is resolved by the U.S. Pat. No. 10,743,517B2 dated Aug. 18, 2020 by providing an automated collection of data about the consumption of the feed by animals, calculation of its volumes and logistic management of its re-filling. Said system comprises a container for storing a dry feed, the container is equipped with a lower inlet, the container is mounted in a vessel with a tilted conveyor belt arranged therein, the belt has blades for capturing and delivering the feed to a hole of the vessel, and a feeding cup is mounted below the hole. The conveyor belt is driven by an electric motor that is controlled by a control unit that is in communication with a microcontroller. Also, a feed availability sensor is mounted in the vessel, the sensor, in particular, may be an infrared sensor or a weight sensor that is also in communication with the microcontroller and transmits information about a controllable level to the microcontroller in order to determine whether the feed level in the vessel is lower than a threshold. The microcontroller initiates communication, in particular, with a remote supplier via a wireless communication network, when the level drops lower than the threshold level for ordering the feed in the feeding system.

A mechanism of communication between the domestic animal feed weight in the feeding system with a feed supply system is disclosed in more detail in the application US2022240486A1 dated Aug. 4, 2022 which describes a networked weight scale for smart ordering. The networked weight scale is a separate device that is made as a base for mounting a feeding system thereon, the device comprises at least one processor that is configured to be connected to a personal network including personal computers, phones, digital assistants, etc., and to be connected to a high-level network, i.e., Internet.

However, these solutions generally resolve a problem of automated animal feeding and are not directly related to the problem of storage of the feed in the closed container, while tracking its availability. A drawback of these solutions is that high-volume containers cannot be used, since the container content contacts with air that is present in the volume of the supply vessel, thus, the feed becomes stale, partially loses its nutritional value and even may be infected with pests. Besides, the networked weight scale being a separate element of the system requires periodical calibration depending on the configuration of the container to be arranged thereon.

SUMMARY OF THE INVENTION

Embodiments of the invention combine, in a stationary container, functional possibilities of preservation of freshness of the feed and controlled re-filling of the content of the container by creating a container for storing feed for domestic animals and a system for managing availability of the feed, the system is integrated into the container equipped with tools for collecting and analyzing information about a weight of the feed by means of digital technologies.

A technical effect being achieved is providing high-quality storage of the feed in the container during periods between use and management of the feed stock in the container by its manufacturer in order to plan interactions with users of the containers and/or with feed suppliers.

According to a first aspect, embodiments of the invention are achieved by providing a container for a dry feed for animals, the container comprises a hollow body having a lower portion and side walls that form an external surface and an inner volume for arranging the feed, and a cap that is movable relative to edges and mounted in a sealable fashion. According to the invention, the lower portion of the body comprises a weighing device that is connected to a microcontroller that comprises a wireless communication module. The microcontroller is configured to periodically record a weight, to transmit data via at least one communication channel and to initiate communication when the recorded weight is equal to or less than a measured weight threshold. The cap is sealable owing to an air pump having a control chip, a pressure sensor that is synchronized with the pump, and a pressure relief valve, while the microcontroller and the pump are connected to a power supply, are arranged within the inner volume of the body and separated from the body by an internal partition, and the pressure relief valve is embedded into a mechanical opening handle that is provided on the cap.

Owing to an air pumping system, when the pump is automatically activated upon triggering of the pressure sensor, a rarefied atmosphere inside the container is created, thereby facilitating moisture removal, reducing the amount of oxygen as an oxidizer and significantly prolonging a shelf life of the feed, while the handle-valve that is provided on the cap enables to reduce a negative pressure that is present in the container and to open it conveniently. When combined with the weighing device controlled by the microcontroller, a problem of indication of the weight by informing not only the amount, but also a time period of changing of the container weight, as well as operatively obtaining the statistical data about usage of the container. At the same time, the structure of the container is simple to manufacture and reliable, the feed and electronic elements are reliably isolated from each other, and their arrangement in the body resolves a problem of safe usage and self-reliance of the container, as well as does not require any additional devices for ensuring its operation, thereby allowing to expand a range of weights of the containers during manufacturing.

According to a preferable embodiment of the invention, the weighing device comprises or consists of four strain gauges that are arranged along a perimeter of the external surface of the lower portion of the body and that may be designed as legs of the container.

Also, according to an exemplary embodiment, additional indication tools that are connected to the microcontroller, such as a display and/or light-emitting diodes, may be arranged on the external surface of the container body.

At the same time, according to possible embodiments, a periodicity of recording the weight by the microcontroller coincides with a periodicity of triggering of the pressure sensor or represents a time interval that is preliminarily set by a timer of the microcontroller.

Besides, the control chip of the pump may be equipped with a timer and configured to periodically additionally trigger the pump.

According to a second aspect, a system is provided for managing availability of a feed, the system comprises the container for the dry feed as mentioned in the previous aspect, the container comprises the weighing device and the microcontroller that is configured to record events of changing the feed amount depending on the container weight and that is associated with an external server that is a server of a container manufacturer comprising:

- tools for processing data about dynamics of changing of the feed weight depending on a recorded weight of the container and a recording period;
- tools for transmitting a notification to at least one user via a mobile application and/or an API protocol;
- tools for initiating communication with at least one user, when the recorded weight is equal or less than a feed amount threshold.

According to a possible embodiment, the manufacturer server comprises tools for preparing recommendations regarding feeding based on said data.

According to a possible embodiment, the user is a container owner and/or an animal feed supplier.

This configuration of the system allows transmitting the data about weight dynamics from the container via a protected communication protocol to the manufacturer server, while it may use the data for providing information to the feed suppliers via API or to transmit information to the end user of the container by means of applications for a mobile or personal computer that has access to the manufacturer server.

BRIEF DESCRIPTION OF THE DRAWINGS

An exemplary embodiment of the container and system, according to the group of inventions, is illustrated by the drawings, which depict the following.

MAIN DESIGNATIONS

Figure 1:
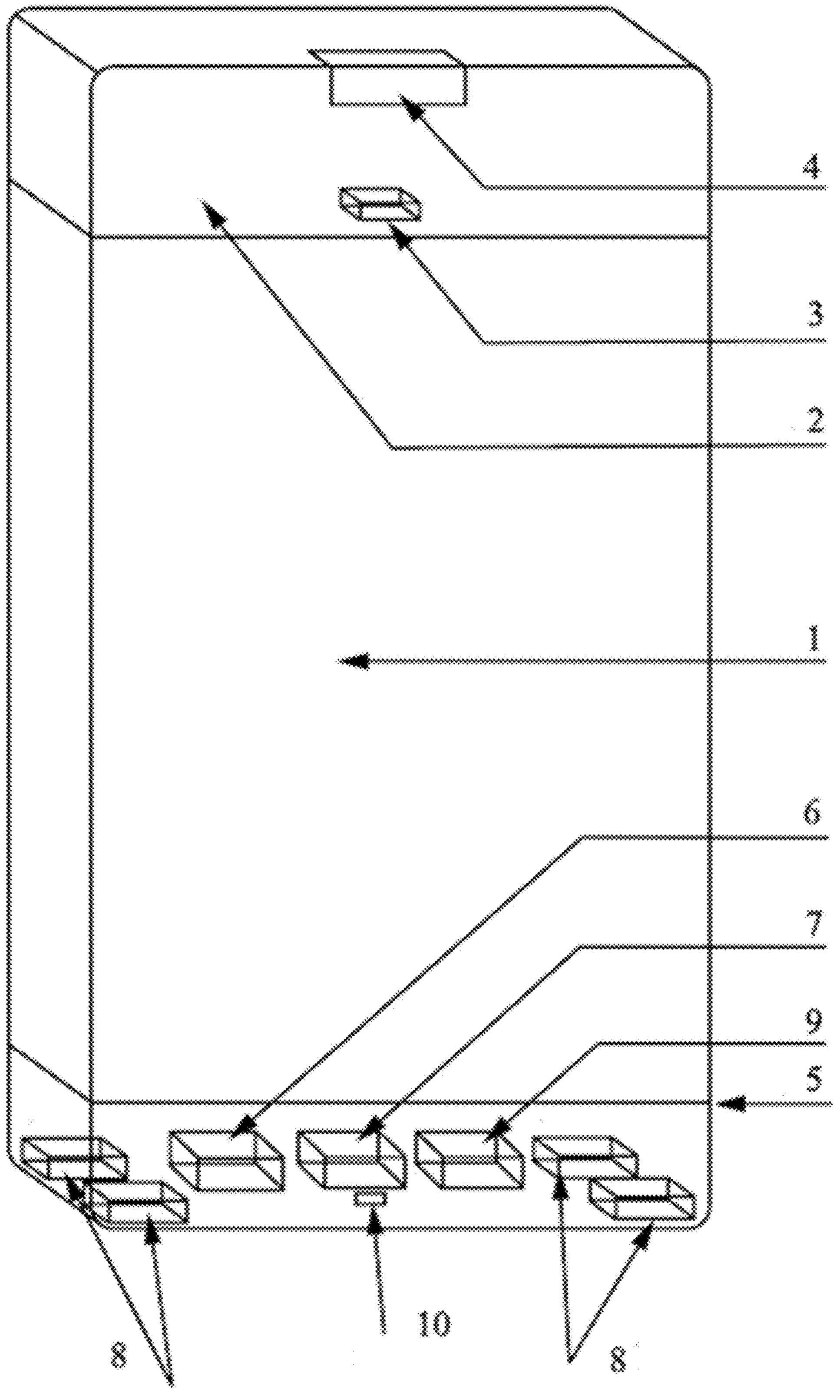
FIG. 1 illustrates the structure of the container depicting main elements.

1. container body
2. cap
3. pressure sensor
4. handle with the pressure relief valve
5. inner partition
6. air pump
7. microcontroller
8. weight sensors
9. power supply unit
10. charging port
11. display
12. light-emitting diodes
13. external server of the manufacturer
14. application of a client being an animal's owner
15. client-server of the feed supplier

IMPLEMENTATION POSSIBILITY

Preferably, a container may be made of plastic and substantially represents a tank with a cap (2) with a space created between its lower upper portion and side portion, the space forms a volume for arranging a feed. A weighing device is arranged in the lower portion of the body (1), the weighing device comprises weight sensors (8) that may be represented by at least four strain gauges based on hx711 sensors that are arranged along a perimeter and connected to a microcontroller (7) having a wireless communication module.

The microcontroller may be implemented based on ESP32/ESP8266 microprocessors or STM32 controller from the STMicroelectronics company for transmitting data via at least one communication channel, namely, WiFi, via 2.4 GHz and 5 GHz protocols, or Bluetooth being both common one and BLE-Bluetooth Low Energy version, or via cellular 2G/3G/4G communication (Cellular).

At the same time, it is implied to use WiFi or Cellular for providing continuous communication of the container with the Internet, and, thus, with a manufacturer server, while using Bluetooth for providing communication with a user's mobile device for initial setting and other devices in the system.

As transport logic protocols, MQTT or, alternatively, AMQP or COAP protocols may be used.

The sealability of the container is ensured by an air pump (6) having a control chip that is arranged in a lower portion of the body (1) of the container, a pressure sensor (3) that is synchronized with the pump (6), and a pressure relief handle-valve (4) in the cap (2), and sealing tools may be arranged between the cap and the body. The microcontroller (7) and the pump (6) are connected to a power supply unit (9), are arranged within an inner volume of the body (1) and are separated from the body by means of an inner partition (5). The power supply unit may be designed as a battery that has a charge controller and that is rechargeable via a port (10) that is provided in the body (1). Besides, the container may be equipped with external indication tools, such as a display (11) and/or light-emitting diodes (12), that are connected to the microcontroller (7). At the same time, in the embodiment illustrated in FIG. 1, the inner partition (5) is made horizontally relative to the lower portion of the container (1), however, it is clear that electronic components may be located in other locations and the location of the partition (5) for avoiding a contact between the electronic elements and the feed will be changed accordingly.

The weight sensors (8) that are connected to the microcontroller (7) measure the weight of the container (1) either according to a preset time interval, e.g., once every four hours, that may correspond to a supposed usage time of the container, or impulsively with a sequence of several seconds, or upon triggering of the pressure sensor (3). Upon triggering of the pressure sensor (3) that indicates the opening of the container (1), the pump (6) is automatically activated, and upon closure of the cap (2), the pump facilitates sealing of the cap with the edges of the container (1) and creation of rarefied air in its inner volume.

At the same time, a difference between primarily set parameters and the current parameters is recorded only after the container weight is changed, the difference corresponds to the amount of a feed portion removed from the container, as well as a time of this event is recorded, in order to form data about a usage time interval, and it is transmitted to the external server (13) of the manufacturer by means of the wireless communication module. If external indication tools (11) and/or (12) are present, the weight of the removed portion is also displayed on a screen or the user is provided with a feedback via the light-emitting diodes, e.g., according to traffic lights principle, where a certain color means availability or non-availability of both the portion and the remainder in the container.

Figure 2:
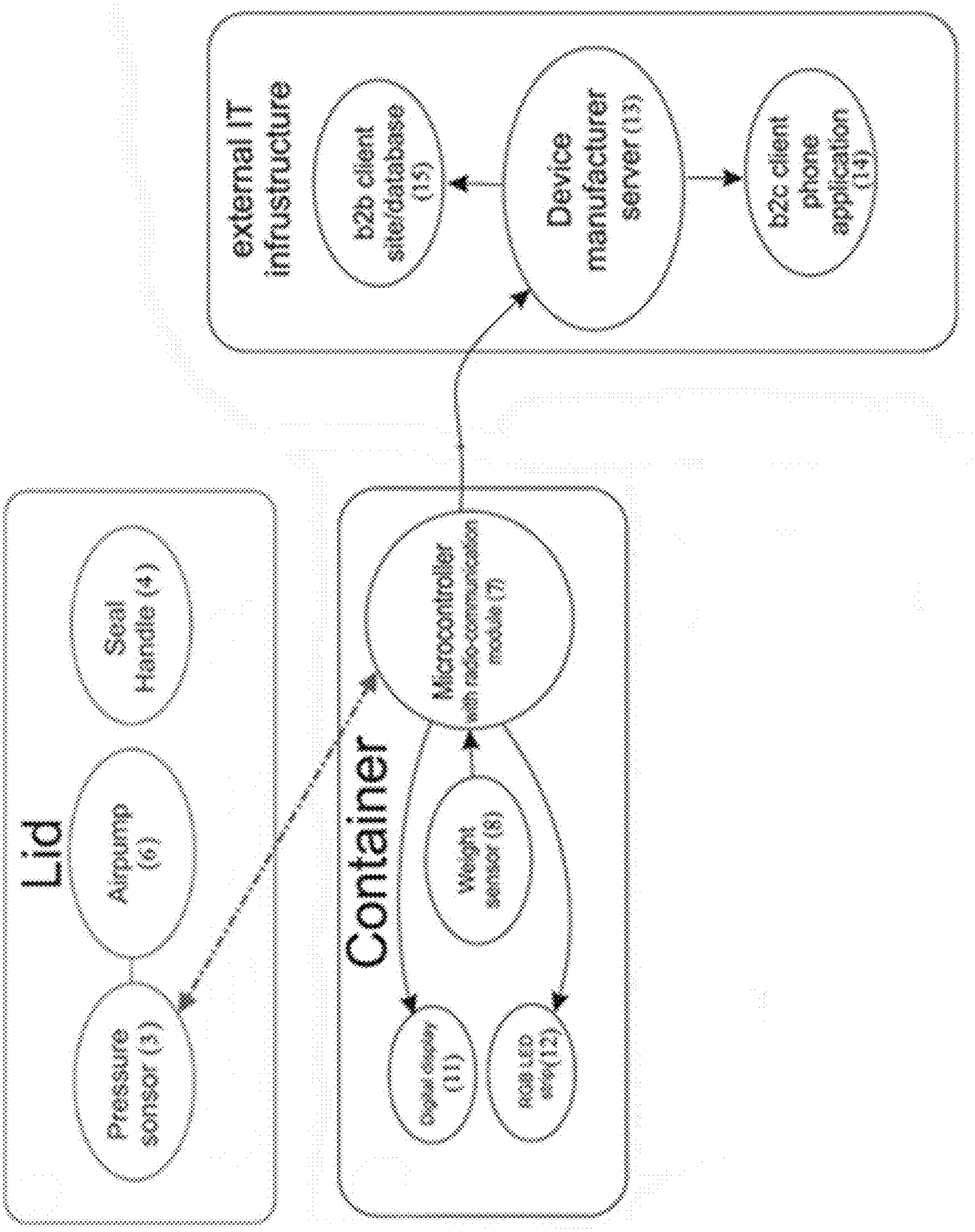
FIG. 2 illustrates main elements of the system that is integrated with the container.

FIG. 2 schematically illustrates an interactive interaction between the container and the manufacturer, where the microcontroller (7) in fact is a communication module for communicating with the external server (13) via wireless technologies. The server (13) of the container manufacturer may be implemented as a physical service or a cloud service and it is equipped with at least a data processing module for processing data about the container's (1) weight change dynamics. The data periodically received from the microcontroller (7) of the container (1) is used to build a container usage plot that may be used as a basis for forming recommendations regarding feeding the animal that are transmitted either via API to a user (15) for placing on a website, if the user is a feed supplier, manufacturer or seller, or are available for the container users via an application (14).

To this end, at least one database having a register of authorized container owners who are animal owners and a register of authorized feed suppliers must be created on the server. After the external servers receive, from the microcontroller, the data that confirms that the container reached a weight threshold that is preset in the microcontroller memory and that usually contains an empty container weight and ⅕ of its full weight, the initiation of the communication of the manufacturer server with the feed supplier via the wireless communication network.

Therefore, the container and the server become a part of IoT technology network, thereby allowing to provide a client with continuous availability of fresh feed, allowing to collect statistical data about feed consumption and to generate advice regarding diet changes, while providing the supplier company with precise information for planning logistics and improving interaction with the consumer, e.g., using a "subscription" model.

At the same time, the feed may be re-filled both by replacing the empty container with a full container and by pouring the necessary amount of the feed into the existing container from a package depending on what service is provided by the feed supplier.

Implementation of the group of inventions will allow the container manufacturer to be an intermediary between the customer and the supplier, while transmitting, to online stores being feed suppliers, data about making orders and customer information to be placed in a customer's personal account on a website, and transmitting the container that improves quality of the feed to the customers.

This structure allows to optimize management of the feed stock and to plan interaction with the feed suppliers, while providing controlled preservation of the feed in the container.

The invention claimed is:

1. A container for a dry feed for animals, the container comprising a hollow body having a lower portion and side walls that form an external surface and an inner volume for arranging the feed, and a cap that is movable relative to edges and mounted in a sealable fashion, wherein the lower portion of the body comprises a weighing device that is connected to a microcontroller that comprises a wireless communication module and that is configured to periodically record a weight, to transmit data via at least one communication channel and to initiate communication when the recorded weight is equal to or less than a measured weight threshold, and the cap is sealable owing to an air pump having a control chip, a pressure sensor that is synchronized with the pump, and a pressure relief valve, and the microcontroller and the pump are connected to a power supply, are arranged within the inner volume of the body and separated from the body by an internal partition, and the pressure relief valve is embedded into a mechanical opening handle that is provided on the cap.

2. The container according to claim 1, wherein the weighing device comprises of four strain gauges that are arranged along a perimeter of the external surface of the lower portion of the body.

3. The container according to claim 1, wherein additional indication tools that are connected to the microcontroller are arranged on the external surface of the body.

4. The container according to claim 1, wherein a periodicity of recording the weight by the microcontroller coincides with a periodicity of triggering of the pressure sensor.

5. The container according to claim 1, wherein a periodicity of recording the weight by the microcontroller represents a preliminarily set time interval.

6. The container according to claim 1, wherein the control chip of the pump is equipped with a timer.

7. A system for managing availability of a feed, the system comprises the container for the dry feed according to claim 1, wherein the container comprises the weighing device and the microcontroller that is configured to record events of changing the feed amount depending on the container weight and to transmit data to an external server that is a server of a container manufacturer, the external server comprising:

tools for processing data about dynamics of changing of the feed weight depending on a recorded weight of the container and a recording period;

tools for transmitting a notification to at least one user via a mobile application and/or an API protocol; and tools for initiating communication with at least one user when the recorded weight is equal to or less than a feed amount threshold.

8. The system according to claim 7, wherein the external server comprises tools for preparing recommendations regarding feeding based on the received data.

9. The system according to claim 7, wherein the at least one user is a container owner and/or an animal feed supplier.

10. A system for managing availability of a feed, the system comprises the container for the dry feed according to claim 2, wherein the container comprises the weighing device and the microcontroller that is configured to record events of changing the feed amount depending on the container weight and to transmit data to an external server that is a server of a container manufacturer, the external server comprising:

tools for processing data about dynamics of changing of the feed weight depending on a recorded weight of the container and a recording period;

tools for transmitting a notification to at least one user via a mobile application and/or an API protocol; and tools for initiating communication with at least one user when the recorded weight is equal to or less than a feed amount threshold.

11. A system for managing availability of a feed, the system comprises the container for the dry feed according to claim 3, wherein the container comprises the weighing device and the microcontroller that is configured to record events of changing the feed amount depending on the container weight and to transmit data to an external server that is a server of a container manufacturer, the external server comprising:

tools for processing data about dynamics of changing of the feed weight depending on a recorded weight of the container and a recording period;

tools for transmitting a notification to at least one user via a mobile application and/or an API protocol; and tools for initiating communication with at least one user when the recorded weight is equal to or less than a feed amount threshold.

12. A system for managing availability of a feed, the system comprises the container for the dry feed according to claim 4, wherein the container comprises the weighing device and the microcontroller that is configured to record events of changing the feed amount depending on the container weight and to transmit data to an external server that is a server of a container manufacturer, the external server comprising:

tools for processing data about dynamics of changing of the feed weight depending on a recorded weight of the container and a recording period;

tools for transmitting a notification to at least one user via a mobile application and/or an API protocol; and tools for initiating communication with at least one user when the recorded weight is equal to or less than a feed amount threshold.

13. A system for managing availability of a feed, the system comprises the container for the dry feed according to claim 5, wherein the container comprises the weighing device and the microcontroller that is configured to record events of changing the feed amount depending on the container weight and to transmit data to an external server that is a server of a container manufacturer, the external server comprising:

tools for processing data about dynamics of changing of the feed weight depending on a recorded weight of the container and a recording period;

tools for transmitting a notification to at least one user via a mobile application and/or an API protocol; and tools for initiating communication with at least one user when the recorded weight is equal to or less than a feed amount threshold.

14. A system for managing availability of a feed, the system comprises the container for the dry feed according to claim 6, wherein the container comprises the weighing device and the microcontroller that is configured to record events of changing the feed amount depending on the container weight and to transmit data to an external server that is a server of a container manufacturer, the external server comprising:

tools for processing data about dynamics of changing of the feed weight depending on a recorded weight of the container and a recording period;

tools for transmitting a notification to at least one user via a mobile application and/or an API protocol; and tools for initiating communication with at least one user when the recorded weight is equal to or less than a feed amount threshold.

15. The system according to claim 10, wherein the external server comprises tools for preparing recommendations regarding feeding based on the received data.

16. The system according to claim 11, wherein the external server comprises tools for preparing recommendations regarding feeding based on the received data.

17. The system according to claim 12, wherein the external server comprises tools for preparing recommendations regarding feeding based on the received data.

18. The system according to claim 13, wherein the external server comprises tools for preparing recommendations regarding feeding based on the received data.

19. The system according to claim 14, wherein the external server comprises tools for preparing recommendations regarding feeding based on the received data.

20. The system according to claim 10, wherein the at least one user is a container owner and/or an animal feed supplier.

21. The system according to claim 11, wherein the at least one user is a container owner and/or an animal feed supplier.

22. The system according to claim 12, wherein the at least one user is a container owner and/or an animal feed supplier.

23. The system according to claim 13, wherein the at least one user is a container owner and/or an animal feed supplier.

24. The system according to claim 14, wherein the at least one user is a container owner and/or an animal feed supplier.

* * * * *